US011885483B2

(12) United States Patent
Tiefel et al.

(10) Patent No.: US 11,885,483 B2
(45) Date of Patent: Jan. 30, 2024

(54) ELECTRONIC DEVICE WITH EXTENDABLE FUNCTIONALITY

(71) Applicant: LEDVANCE GmbH, Garching bei Munchen (DE)

(72) Inventors: Dominik Tiefel, Eichstatt (DE); Michael Koch, Dollnstein (DE); Johann Asam, Adelzhausen (DE); Lambert Frye, Steinheim (DE)

(73) Assignee: LEDVANCE GMBH, Garching Bei München (DE)

( * ) Notice: Subject to any disclaimer, the term of this patent is extended or adjusted under 35 U.S.C. 154(b) by 0 days.

(21) Appl. No.: 17/191,114

(22) Filed: Mar. 3, 2021

(65) Prior Publication Data

US 2021/0278071 A1 Sep. 9, 2021

(30) Foreign Application Priority Data

Mar. 3, 2020 (DE) ......................... 102020105692.3

(51) Int. Cl.
*F21V 23/06* (2006.01)
*F21S 2/00* (2016.01)
*H01R 13/514* (2006.01)

(52) U.S. Cl.
CPC .............. *F21V 23/06* (2013.01); *F21S 2/005* (2013.01); *H01R 13/514* (2013.01)

(58) Field of Classification Search
CPC ... F21K 9/23; F21K 9/20; F21K 9/235; F21K 9/27; F21V 19/003; F21V 23/026; F21V 23/0464; F21V 23/06; F21S 2/00
See application file for complete search history.

(56) References Cited

U.S. PATENT DOCUMENTS 7,892,000 B1 * 2/2011 Yen ........................ H01R 33/94 439/236
8,360,609 B2 * 1/2013 Lee ........................ H05B 45/34 362/249.07
8,410,702 B2 * 4/2013 Lee ........................ F21V 3/062 362/249.02

* cited by examiner

*Primary Examiner* — William J Carter
(74) *Attorney, Agent, or Firm* — Hayes Soloway PC

(57) ABSTRACT

A base module of an electronic device is adapted to provide a basic functionality, wherein the base module comprises a connection device for electrically contacting the base module, and wherein the connection device is adapted to establish an electrical connection between the base module and an extension module for functional extension of the base module, so that the base module may be electrically contacted through the extension module. Furthermore, an extension module and an electronic device with extended functionality are proposed.

18 Claims, 14 Drawing Sheets

ELECTRONIC DEVICE WITH EXTENDABLE FUNCTIONALITY

CROSS-REFERENCE TO RELATED APPLICATIONS AND PRIORITY

This patent application claims priority from German Patent Application No. DE 102020105692.3 filed Mar. 3, 2020, which is incorporated by reference herein in its entirety.

TECHNICAL FIELD

The present disclosure relates generally to electronic devices with extendable functionality. More specifically, the present disclosure relates to electronic ballasts and lighting devices with extendable functionality.

BACKGROUND

Electronic devices are occasionally replaced or upgraded to newer devices with enhanced functionality. In particular, electronic ballasts and lighting devices are upgraded to meet modern requirements for controllability and network capability. The old devices must be disposed of, which can lead to high costs and a high environmental impact.

SUMMARY

An objective of the embodiments of the present disclosure is to provide electronic devices, in particular lighting devices and ballasts, which can be retrofitted in a cost-effective and environmentally friendly manner.

To reach this objective, a base module of an electronic device is proposed in a first aspect, wherein the base module is adapted to provide a basic functionality.

The electronic device may be designed in particular as a lighting device, such as illuminant, lamp or luminaire, but also as a ballast, in particular for operating a lighting device.

In the case of a lighting device, for example, the basic functionality may be that the lighting device generates light when switched on, and that the lighting device may be switched on and off. In the case of a ballast, the basic functionality may be, in particular, that when a lighting device is switched on, it is supplied with electrical power.

The base module has a connection device for electrically contacting the base module, wherein the connection device is designed to establish an electrical connection between the base module and an extension module for extending the functions of the base module, and wherein the base module may be electrically contacted through the extension module.

The fact that the base module may be electrically contacted by means of the extension module makes it possible, in particular, for the connection device of the base module to be used both for electrically contacting the base module and for extending the functions of the base module by means of the ballast. Thus, retrofitting of the base module can be done in a simple way by attaching the extension module. A basic product with basic functions, for example a ballast or luminaire with basic functions, can thus be retrofitted in a simple manner by connecting a further component, in particular an extension module, for example a network-capable smart module with a communication interface.

The connection device may comprise a voltage connection for transmitting electrical power and/or a signal connection for transmitting electrical signals. In particular, a correspondingly designed extension module with voltage connection and signal may be attached to the connection device so that the electrical signals and the electrical voltage are transmitted through the extension module to the base module.

The signal connection may be designed in the form of a plug connector, in particular as a standardized plug socket for signal transmission. An extension module with a corresponding, standardized signal connection may thus be used to receive control signals for controlling the base module, if necessary.

The plug connector of the base module may be designed as a circuit-board-plug-connector. In particular, the circuit-board-plug-connector may be easily attached directly to a circuit board of the base module, wherein the corresponding circuit-board-plug may also be easily attached to a circuit board of the extension module.

The voltage connection may include a connection terminal for receiving one or more contact pins or contact wires. The connection terminal may be designed for connecting the base module with a voltage or current source. In particular, the connection terminal may be designed as a standard connection terminal for connecting to the mains voltage. The connection terminals, in particular standardized terminals, are inexpensive and well suited for safely connecting electronic devices, in particular the base module, to a power supply, directly or through an extension module.

The connection device may have a fastening element for mechanically fastening the extension module to the base module. Fastening may be accomplished with a threaded fastener or any other known means of mechanically fastening two objects. By mechanically attaching the extension module to the base module, the electrical connection between the extension module and the base module may be secured.

In some embodiments, the base module has an elongated housing with a profile. In particular, the housing may be designed in such a way that when the base module is connected to an extension module that conforms to the base module, the result is an assembled housing with the same profile. In particular, the base modules and the extension modules may be assembled according to a modular principle without significantly changing or impairing the appearance or design.

According to a second aspect, an extension module for retrofitting an electronic device is proposed, comprising a base module with a connection device for electrically contacting the base module. The extension module comprises a first connection device for connecting the extension module to the connection device of the base module and a second connection device for electrically contacting the extension module. The first connection device and the second connection device are interconnected in such a way that after connecting the extension module to the base module, the base module may be electrically contacted via the second connection device of the extension module.

The fact that the base module may be electrically contacted through the extension module makes it possible for the extension module to serve both to extend the functions of the base module and to electrically contact the base module. This means that the base module may be retrofitted in a simple manner by attaching the extension module.

The first connection device of the extension module may include a voltage connection for transmitting electrical power and/or a signal connection. The voltage connection of the extension module allows the base module to be supplied with electrical power through the extension module in a simple manner. In particular, the base module may be supplied with electrical power through the expansion module, wherein the electrical power is transferred from a voltage source (e.g. from the voltage grid) to the base module via a voltage connection of the second connection device of the extension module, via the electrical circuitry within the extension module and via the voltage connection of the first connection device of the extension module. The base module of the electronic device can thus be easily supplied with power when using the extension module.

Through the signal transmission between the base module and the extension module, an extended functionality of the electronic device may be achieved. In particular, an electronic device with a basic functionality may be upgraded to a smart device.

The signal connection may be designed in the form of a plug connector, in particular as a standardized plug socket for signal transmission. The extension module may thus be connected to a base module with a corresponding signal connection in order to pass on control signals to the base module. The plug connector of the extension module may be designed as a circuit-board-plug-connector. In particular, the circuit-board-plug-connector may be easily attached directly to a circuit board of the extension module, wherein the corresponding circuit-board-plug may also be easily attached to a circuit board of the corresponding base module. By inserting the circuit-board-plug into the circuit-board-plug-connector, a reliable signal connection between the base module and the extension module may be ensured.

The first connection device and the second connection device may be designed complementary to each other. In particular, the second connection device may be identical or similar to the connection device of a base module. Due to the complementary design of the first connection device and the second connection device, the second connection device of the extension module may be used to simulate the connection device of the base module so that no conversion of the electrical installation is necessary for connecting the electronic device with expanded functionality.

The extension module may include a functional unit for functional extension of the base module, wherein the functional unit comprises a communication interface and/or a sensor system. In particular, the extension module can be a ZigBee®, Bluetooth®, DALI® module or similar. ZigBee® is a registered trademark of the ZigBee Alliance. Bluetooth® is a registered trademark of the Bluetooth Special Interest Group. DALI® (Digital Addressable Lighting Interface) is a registered trademark of the International Standardisation Consortium for Lighting and Building Automation Networks. By using a standardized Interface, the electronic device may be controlled remotely using standard protocols.

According to a third aspect, an electronic device with extended functionality is provided. The electronic device includes a base module for providing a basic functionality, wherein the base module includes a connection device for electrically contacting the base module, and an extension module for functionally extending the base module. The extension module may have a first connection device for connecting the extension module to the connection device of the base module, and a second connection device for electrically contacting the extension module, wherein the first connection device and the second connection device may be connected to one another in such a way that, after the extension module has been connected to the base module, the base module may be electrically contacted via the second connection device of the extension module.

With the electronic device, expanded functionality may be provided, wherein the base module is still used. Thus, the base module may be retrofitted in a simple way.

The base module and the extension module may each have a housing, wherein the housing of the base module and the housing of the extension module are designed to conform with each other. In particular, the housing of the extension module may be designed in such a way that attaching the extension module to the base module does not significantly change or impair the appearance of the electronic device. The conformal design of the housings may be particularly advantageous when the aesthetics of the electronic device are important, such as in the case of lights or ballasts that are visually perceptible to users.

The electronic device may have at least one adapter and/or a strain relief device for attachment to the connection device of the base module or to the second connection device of the extension module. With the help of the adapter, the application-specific application possibilities of the electronic device may be expanded. With the help of the strain relief device, it can be ensured that the connection points on the base module or on the second connection device are not subjected to excessive tensile force from electrical cables.

In the embodiments when the electronic device is designed as a lamp, the lamp may be installed in different luminaires with appropriately designed adapters.

The electronic device may have at least one cover cap for attachment to the at least one adapter. The cover caps may be used to cover the mechanical and electrical connections of electrical devices in particular of lighting devices or ballasts, so that they are not visible or directly accessible from the outside.

The base module may comprise a ballast and/or light engine. Accordingly, depending on the embodiment example, the electronic device may be designed as a lamp, luminaire, and/or ballast.

BRIEF DESCRIPTION OF THE DRAWINGS

The invention is now explained in more detail with the aid of the attached figures. The same reference numbers are used in the figures for identical or similarly parts.

DETAILED DESCRIPTION OF THE DRAWINGS

Figure 1:
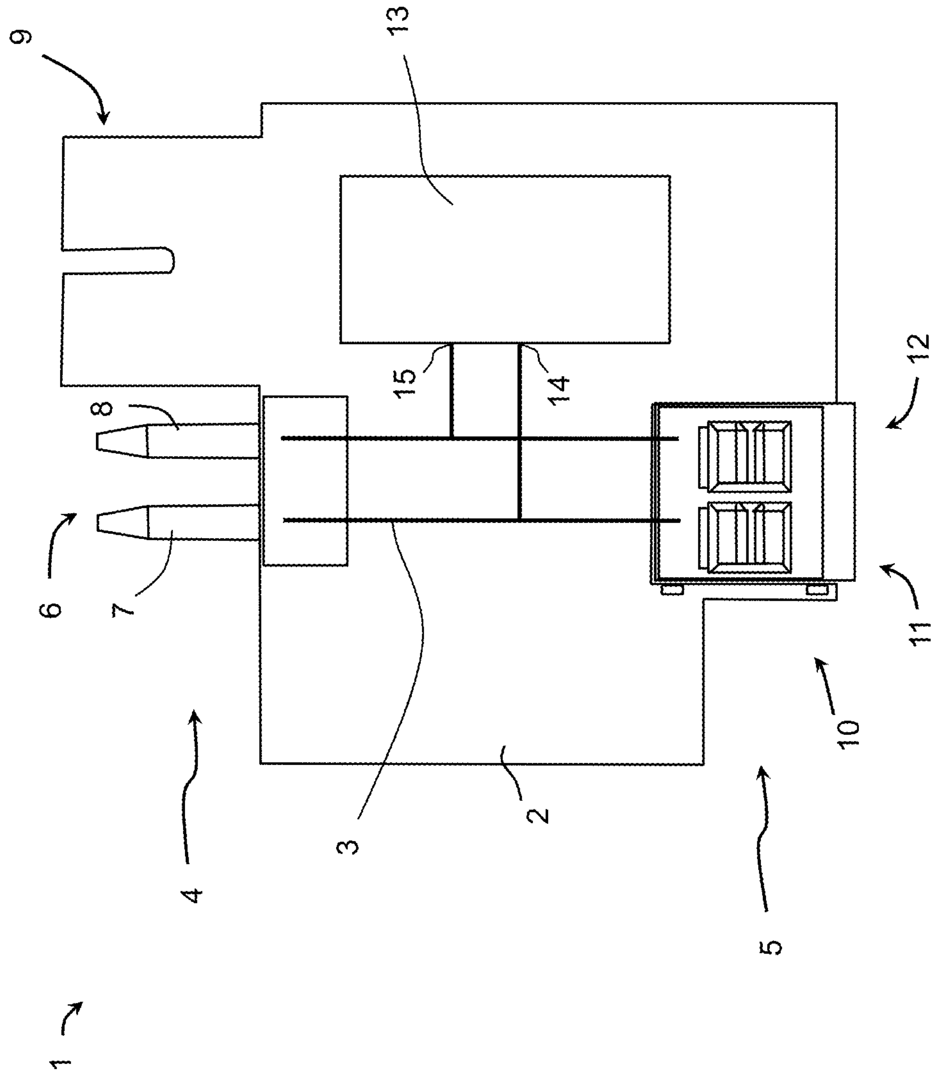
FIG. 1 Shows a schematic electrical circuit diagram of an extension module according to an exemplary embodiment.

FIG. 1 schematically shows an electrical circuit diagram of an extension module according to an exemplary embodiment. The extension module 1 has a circuit board or substrate 2 in the form of a printed circuit board, on which electrical lines 3 are formed. Furthermore, the extension module 1 has a first connection device 4 and a second connection device 5. The first connection device 4 comprises a voltage connection 6 with a first contact pin 7 and with a second contact pin 8 as well as a circuit board connector 9. The first connection device 4 is designed in particular to connect the extension module 1 electrically and/or mechanically to an electronic device or to a base module.

The second connection device 5 comprises a voltage connection 10 in the form of a plug socket with a first connection terminal 11 and with a second connection terminal 12, wherein the connection terminal may be designed to receive contact pins. The first connection terminal 11 and the second connection terminal 12 are electrically connected to the first contact pin 7 and the second contact pin 8 of the first connection device via the electrical lines 3. The connection terminal 10 is designed to connect the extension module 1 to a power supply or voltage network.

The extension module 1 also has a functional unit 13 with a first electrical connection 14 and a second electrical connection 15. The first electrical connection 14 of the functional unit 13 is connected to the first connection terminal 11 of the second connection device 5 via the electrical lines 3 and the second electrical connection 15 of the functional unit 13 is electrically connected to the second connection terminal 12 of the second connection device 5.

The functional unit 13 may in particular comprise a communication interface for receiving control signals for controlling an electronic device. In some embodiments, the functional unit 13 is designed as a ZigBee® module. Depending on the exemplary embodiment, the functional unit 13 may also be designed as a Bluetooth®, or DALI® module. ZigBee® is a registered trademark of the ZigBee Alliance. Bluetooth® is a registered trademark of the Bluetooth Special Interest Group. DALI® (Digital Addressable Lighting Interface) is a registered trademark of the International Standardisation Consortium for Lighting and Building Automation Networks.

Figure 2:
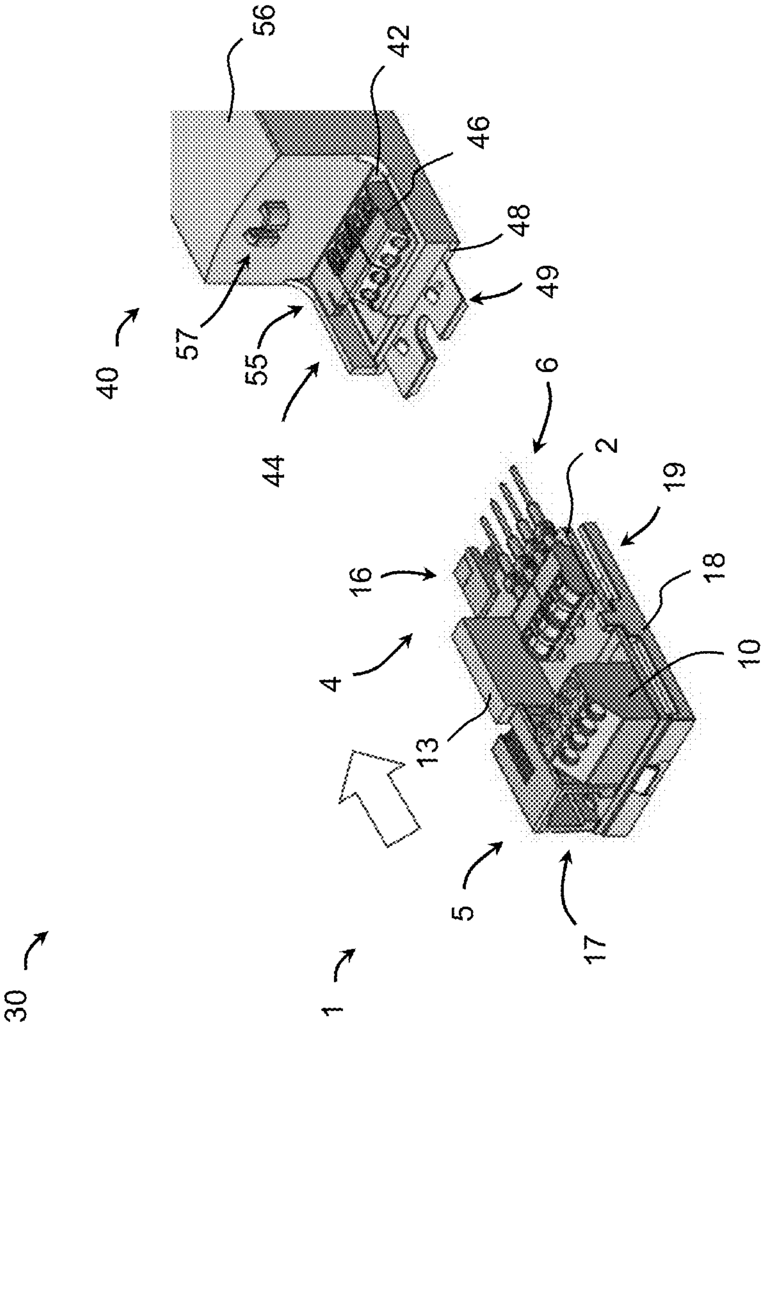
FIG. 2 Shows the process of connecting a base module to an extension module to provide an electronic device with enhanced functionality, according to an exemplary embodiment.

FIG. 2 illustrates the process of connecting a base module to an extension module to provide an advanced functionality electronic device according to an exemplary embodiment. The electronic device 30 with extended functionality includes an extension module 1 and a base module 40. The extension module 1 of FIG. 2 includes a circuit board 3 on which a first connection device 4, a second connection device 5 and a functional unit 13 are arranged.

In the embodiment of FIG. 2, the first connection device 4 of the extension module 1 has a voltage connection 6 in the form of a contact pin strip and a signal connection 16 in the form of a plug. The second connection device 5 also has a voltage connection 10 and a signal connection 17. The voltage connection 10 is in the form of a contact terminal and the signal connection 17 is in the form of a contact socket. The voltage connection 10 and the signal connection 17 of the second connection device 5 are designed complementary, in particular as matching counterparts, to the voltage connection 6 or the signal connection 16 of the first connection device 4. The extension module 1 also has a housing base 18, which is designed to hold or retain the circuit board 3. In the housing base 18 is a fastening element 19 for mechanically connecting the housing base 18 to a housing base of a module or an electronic device. The extension module 1 has further a housing cover, which is not shown in FIG. 2 for better illustration.

The base module 40 is only partially shown in FIG. 2. The base module 40 has a circuit board 42 with electrical lines (not shown) and a connection device 44 with a voltage connection 46 for supplying voltage and/or power to the base module 40. The base module 40 also has a housing base 48 with a fastening element 49 for fastening or holding the base module 40. The connection device 44 of the base module 40 further contains a signal connection 55 for transmitting control signals. The connection device 44 of the base module is designed complementary to or as a matching counterpart with the connection device 4 of the extension module 1. The base module 40 further contains a housing cover 56 with a fastening element 57, which is designed to receive a fastening pin of a cover cap (not shown).

To provide the electronic device 30 with extended functionality, the extension module 1 and the base module 40 are assembled by a translational movement relative to each other (illustrated by the wide arrow). In doing so, the connection device 4 of the extension module 1 and the connection device 44 of the base module 40 are brought together in such a way that the voltage connection 6 or the contact pin strip of the extension module 1 is connected to the voltage connection 46 or the connection terminal of the base module 40, wherein the signal connection 16 of the extension module 1 is connected to the signal connection 55 of the base module 40. In addition, the fastening element 19 of the extension module 1 is mechanically connected to the fastening element 49 of the base module 40.

Figure 3:
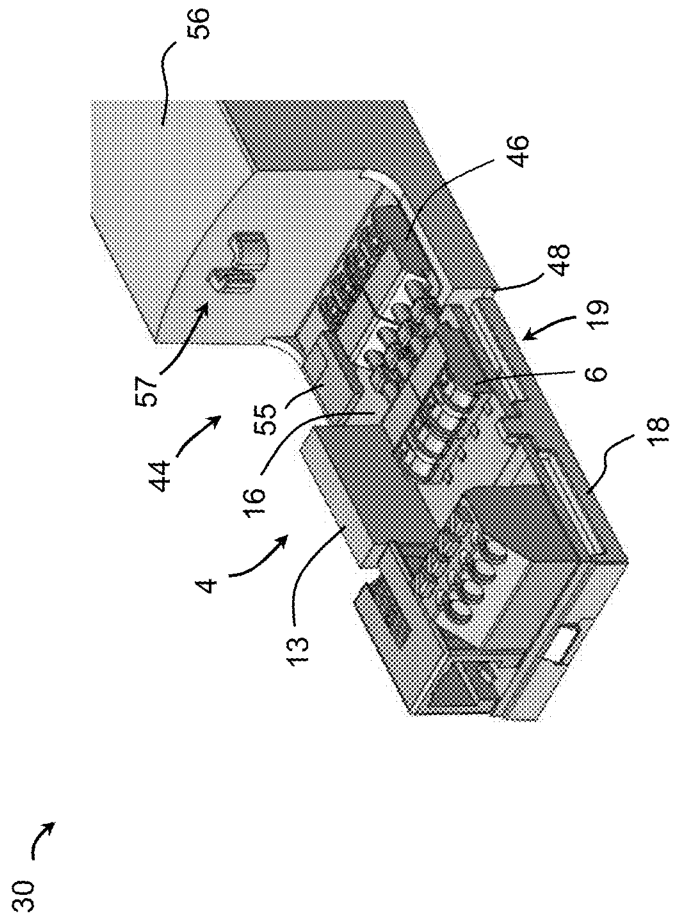
FIG. 3 Shows the connection between the base module and the extension module according to the example in FIG. 2.

FIG. 3 shows the connection between the base module and the extension module according to the exemplary embodiment of FIG. 2. As shown in FIG. 3, the connection device 4 of the extension module 1 and the connection device 44 of the base module 40 are connected to each other, wherein the voltage connection 6 of the extension module 1 is connected to the voltage connection 46 of the base module 40, and the signal connection 16 of the extension module 1 is connected to the signal connection 55 of the base module 40. The housing base 18 of the extension module 1 is mechanically connected to the housing base 48, wherein the fastening element 19 of the housing base 18 and the fastening element 49 (not visible in FIG. 3) of the housing base 48 of the base module 40 interlock. Thus, an electromechanical connection is provided between the extension module 1 and the base module 40, which ensures a reliable signal and voltage transmission between the extension module 1 and the base module 40 as well as a mechanical fastening of the extension module 1 to the base module 40.

Figure 4:
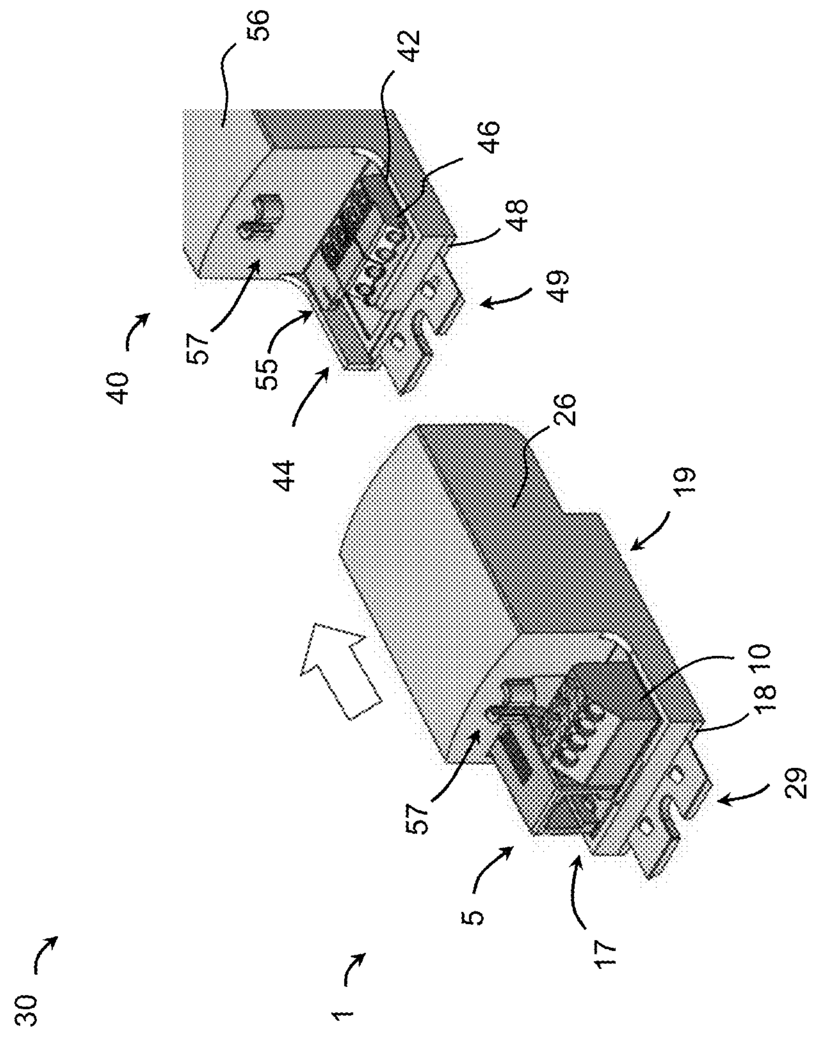
FIG. 4 Shows the process of connecting a base module to an extension module to provide an electronic device with extended functionality as shown in FIG. 2.

FIG. 4 illustrates the process of connecting a base module to an extension module to provide an extended functionality electronic device of FIG. 2. The electronic device 30 with extended functionality of FIG. 4 is substantially similar in construction to the electronic device of FIG. 2 and includes an extension module 1 and a base module 40. Unlike FIG. 2, FIG. 4 also shows a housing cover 26 of the extension module 1, wherein the housing 26 also having a fastening element 57 for receiving a fastening pin of a cover cap (not shown).

The extension module 1 of FIG. 4 also has a housing base 18, wherein a fastening element 19 is formed on the housing base 18 for mechanically fastening the extension module 1, in particular to a base module.

To provide the electronic device 30 with extended functionality, the extension module 1 and the base module 40 are assembled by a translational movement relative to each other (illustrated by the wide arrow). In doing so the connection device 4 of the extension module 1 and the connection device 44 of the base module 40 are brought together in such a way that the voltage connection 6 or the contact pin strip of the extension module 1 is connected to the voltage connection 46 or the connection terminal of the base module 40, and the signal connection 16 of the extension module 1 is connected to the signal connection 55 of the base module 40. In addition, the fastening element 19 of the extension module 1 is mechanically connected to the fastening element 49 of the base module 40. The housing 26 of the extension module and the housing 56 of the base module 40 complementarily join so that the electronic device 30 appears as a whole with a two-part housing.

Figure 5:
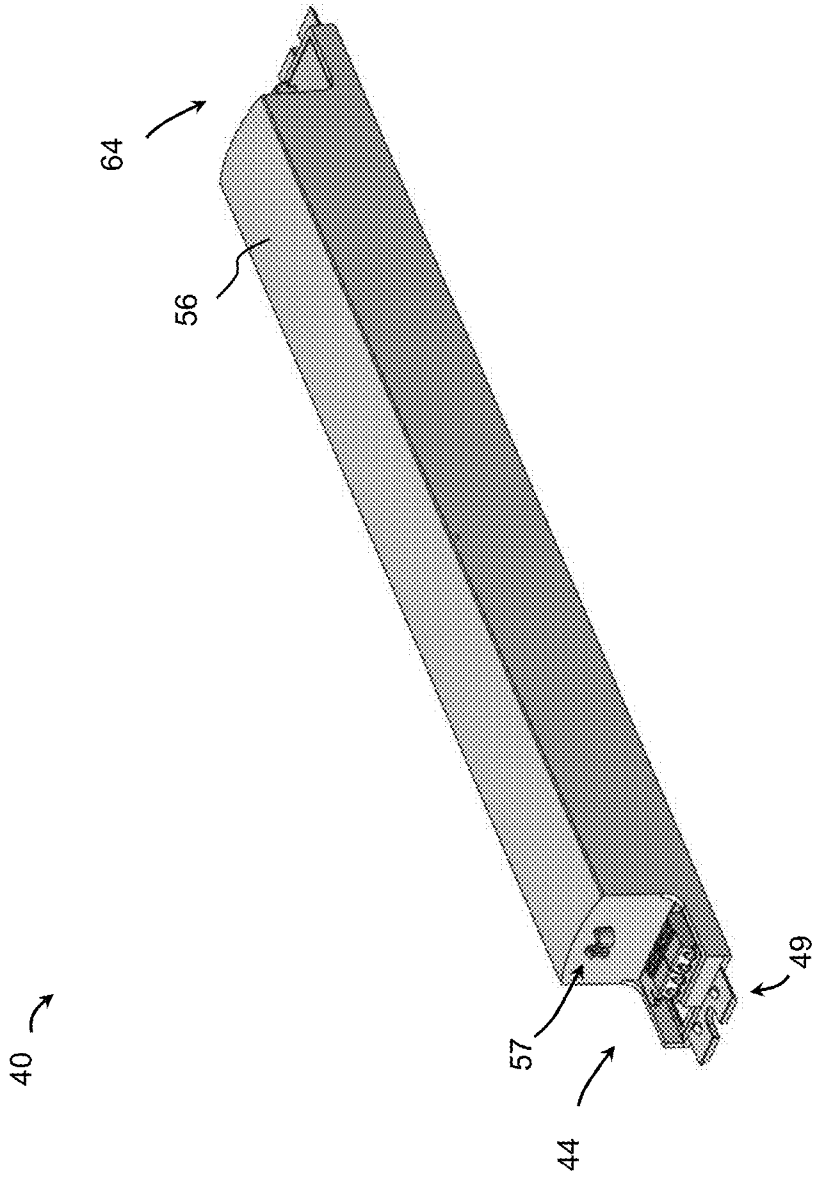
FIG. 5 Shows a perspective view of a base module in the form of a ballast for installation in a luminaire according to an exemplary embodiment.

FIG. 5 shows a perspective view of a base module in the form of a ballast for installation in a luminaire according to an exemplary embodiment. In this embodiment, the base module 1 is an elongated LED light (LED Linear Light) that has a partially light-transmitting or translucent housing 56. Within the housing 56, an LED light source (not shown) is arranged together with driver electronics (not shown) for driving the light source. The base module 40 of FIG. 5 is substantially the same as the base module 40 shown in FIGS. 2, 3 and 4 and has at a first end a first connection device 44 of the type described above in FIGS. 2, 3 and 4. At a second end, the base module 40 has a second connection device 64. Depending on the exemplary embodiment, the connection devices 44 and 64 may be substantially identical or different.

Figure 6:
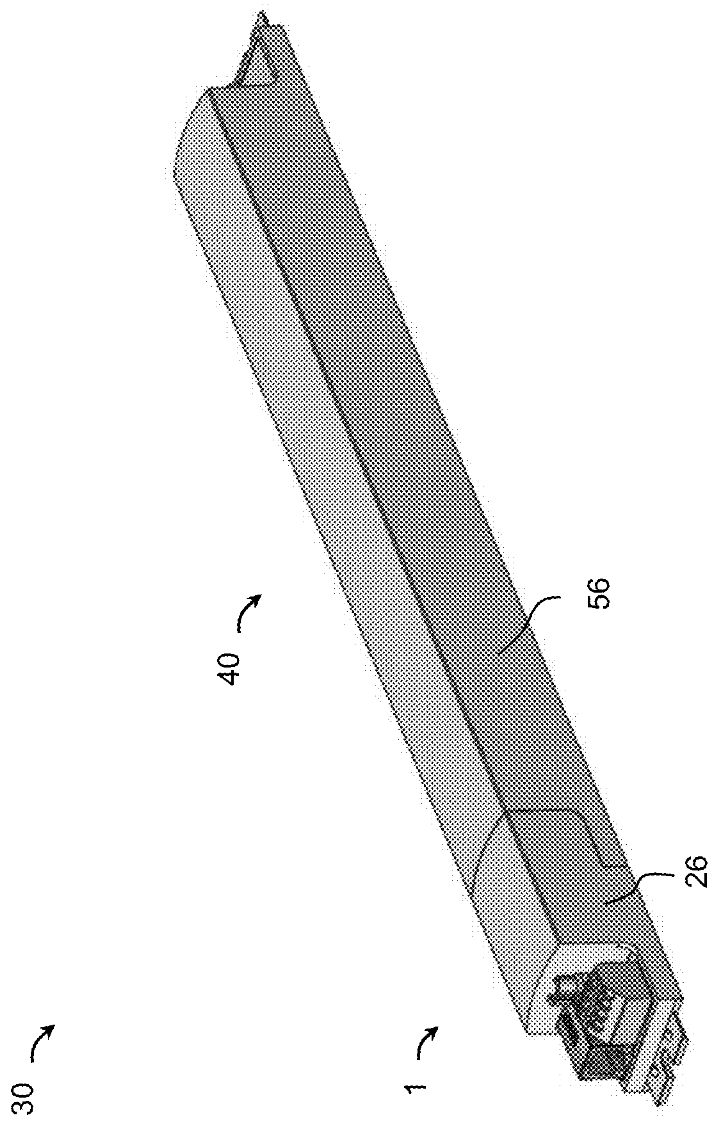
FIG. 6 Shows a perspective view of an electronic device in the form of a ballast with expanded functionality for installation in a luminaire according to an exemplary embodiment.

FIG. 6 shows a perspective view of an electronic device in the form of a ballast with extended functionality for installation in a luminaire according to an exemplary embodiment. In this example, the electronic device 30 is in the form of an LED luminaire with extended functionality and comprises the base module 40 of FIG. 5 and an extension module 1 connected to the base module 40. The housing 26 of the extension module 1 and the housing 56 of the base module 40 are formed to conform to each other in such a way that they complement each other to form a two-part housing without noticeably changing or impairing the appearance of the LED light.

Due to the extension module 1, different additional functions will be realized in the electronic device 30 or LED luminaire depending on the exemplary embodiment. In some embodiments, the extension module 1 accommodates wireless communication interfaces that enable control of the electronic device 30 or the lamp based on a standard protocol, such as ZigBee®, Bluetooth®, DALI® or the like. The extension module may also have other components, such as a microcontroller or sensor technology (for example, motion and/or light sensors). By connecting the extension module 1 to the base module 40, a base module 40 with basic functionality can be extended into a network-capable “smart” device.

In the case of ballasts, depending on the embodiment, the smart module may be located both on the primary side or voltage input of the ballast and also on the secondary side or voltage output of the ballast. It should also be noted that the voltage connection of the electronic device 30 with extended functionality and the base module 40 are substantially identical in construction, so that the electronic device 30 may be connected in a simple manner to a power source, in particular to the mains voltage.

Figure 7:
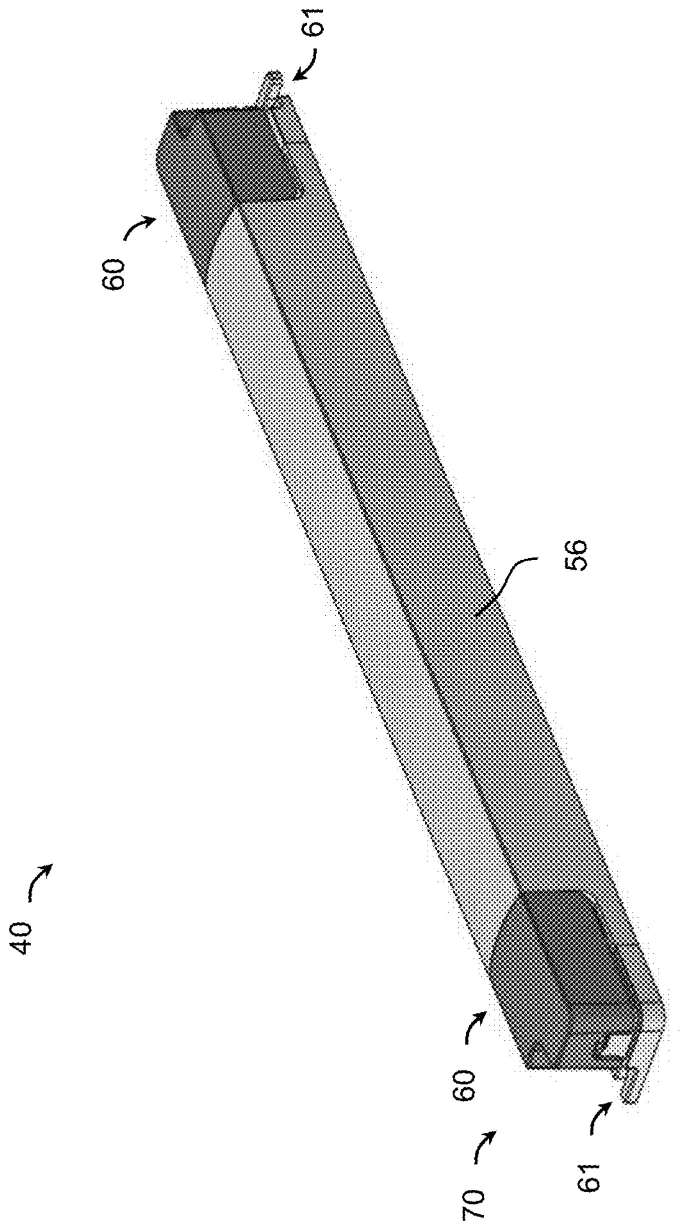
FIG. 7 Shows a perspective view of a base module in the form of a ballast according to FIG. 5 including strain relief for use outside the luminaire.

FIG. 7 shows a perspective view of a base module in the form of a ballast as shown in FIG. 5, including a strain relief for use outside the luminaire. In this embodiment, the base module 40 represents an elongated LED light (LED Linear Light) as shown in FIG. 5, wherein at both ends of the LED light, cover caps 60 and fastening elements 61 are arranged. The cover caps 60 serve to conceal mechanical and electrical connections of the LED luminaire so that they are not visible or directly accessible from the outside. The fastening elements and the cover caps 60 are designed in such a way that strain relief of the connection cable is achieved at the contact points. This ensures that the cable connection points on the ballasts are not subjected to excessive tensile stress, in particular in external applications when the ballasts are used outside of luminaires, for example to supply power to a lighting panel.

Figure 8:
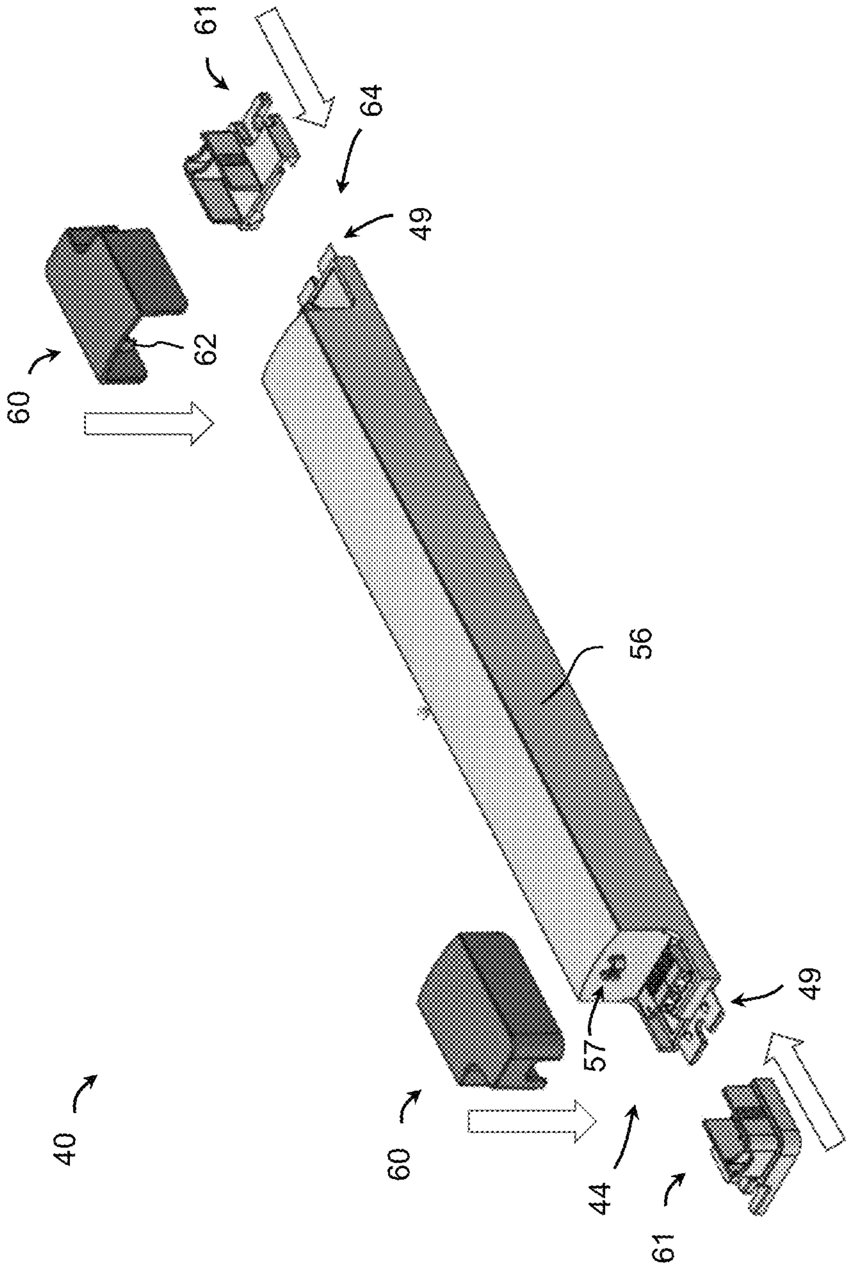
FIG. 8 Shows the installation of the strain relief on the ballast unit according to FIG. 7.

FIG. 8 shows the assembly of the strain relief on the ballast according to FIG. 7. FIG. 8 is intended to illustrate the retrofitting of the base module 40 according to FIG. 5 with fastening elements 61 for strain relief and cover caps 60. The fastening elements 61 are designed in such a way that they may be used both to hold the cover caps 60 and to fasten the base module 40 to a holder. In addition, the fastening elements 61 can serve as an adapter, for example to attach the electronic device 30 to a predetermined holder.

The fastening elements 61 are placed on the fastening elements 49 of the base module 40 by a translational movement along the base module 40, after which the cover caps 60 for covering the connection devices 44 and 64 are placed by a translational movement of the cover caps. The translational movement is illustrated by wide arrows in FIG. 8. The cover caps are secured to the fastening elements 57 of the housing 56 with fastening pins 62.

Figure 9:
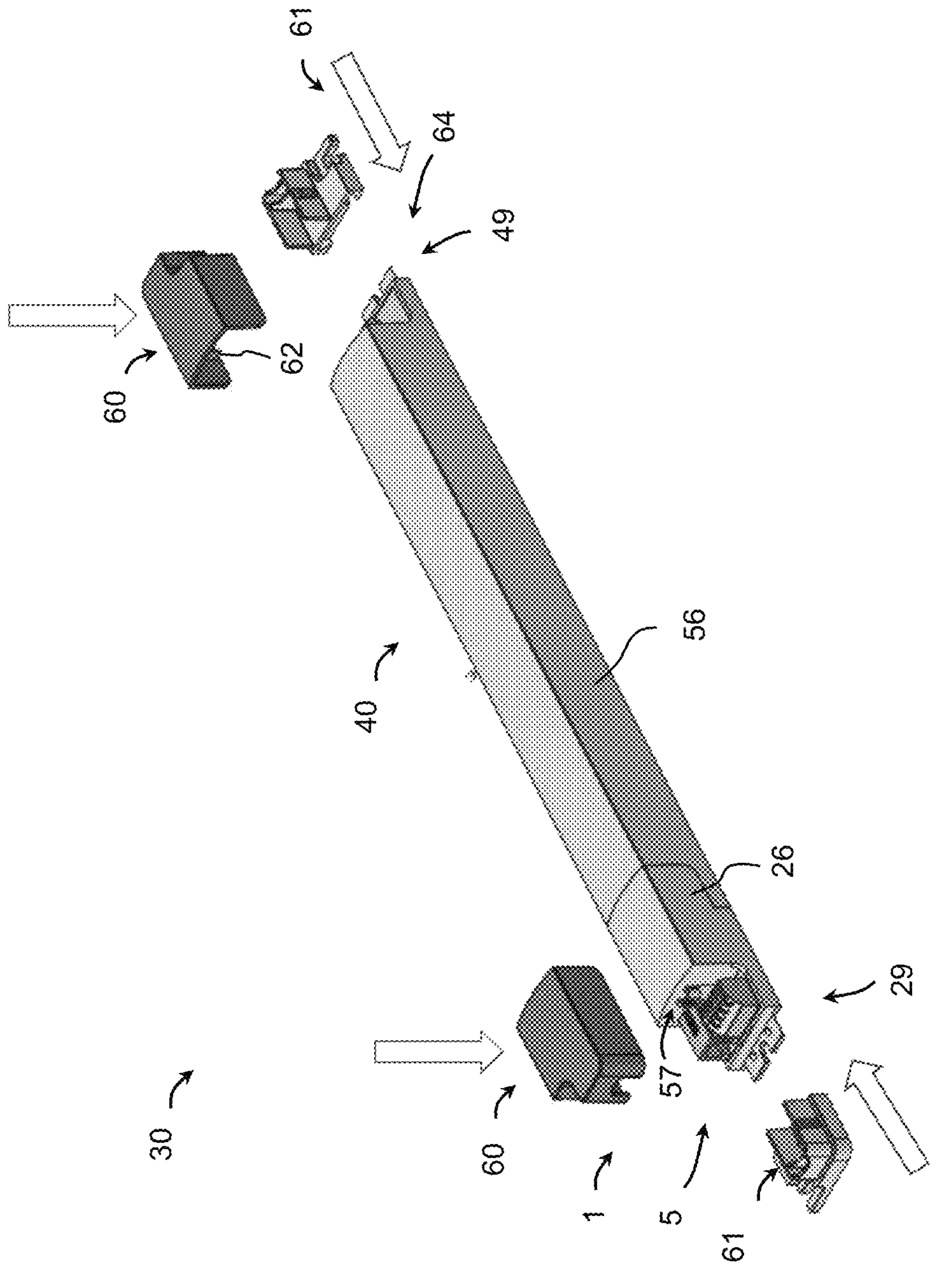
FIG. 9 Shows the installation of the strain relief on the ballast with expanded functionality according to FIG. 6.

FIG. 9 shows the assembly of the strain relief on the ballast with extended functionality according to FIG. 6. The electronic device 30 of FIG. 9 includes a base module 40 according to FIG. 5, an extension module 1 according to FIG. 4 as well as cover caps 60 and fastening elements 61 according to FIG. 7. The electronic device 30 with extended functionality shown in FIG. 9 may be assembled in a simple manner. For this purpose, the first connection device 4 of the extension module 1 is connected to the connection device 44 of the base module 40. A first fastening element 61 is connected to the second connection device 5 of the extension module 1, in which the first fastening element 61 is placed on the fastening element 29 of the extension module 1. The second fastening element 61 is placed on the fastening element 29 of the second connection device 64. The fastening caps 60 are then placed on the fastening elements 61, wherein the fastening caps are secured with fastening pins 62 to the fastening element 27 of the extension module 1 and to the fastening element 57 of the base module 40.

As explained above, the base module 40 may be designed as a lamp module or luminaire module with a basic functionality. In the simplest case, in particular for standard or mass products, the basic functionality may be limited to performing a switch-on or switch-off function of the lamp or luminaire.

The extension module, according to the first aspect, may be used to retrofit the base module, wherein the functionality of the base module may be extended without having to replace the base module or its components, in particular the driver or ballast. Thus, retrofitting of existing electronic devices may be done in a cost-effective and environmentally friendly manner. In particular, the extension module may comprise a wireless communication interface for controlling the electronic device with a standard protocol. In particular, in the case where the base module is designed as a lamp or luminaire, an extension module with a DALI® interface may be used so that the lamp or luminaire can be controlled using the DALI® protocol.

All ballasts shown in FIGS. 2-9 are linear ballasts. However, the principles described herein may also be applied to other ballasts, such as non-linear ballasts or compact ballasts.

Figure 10:
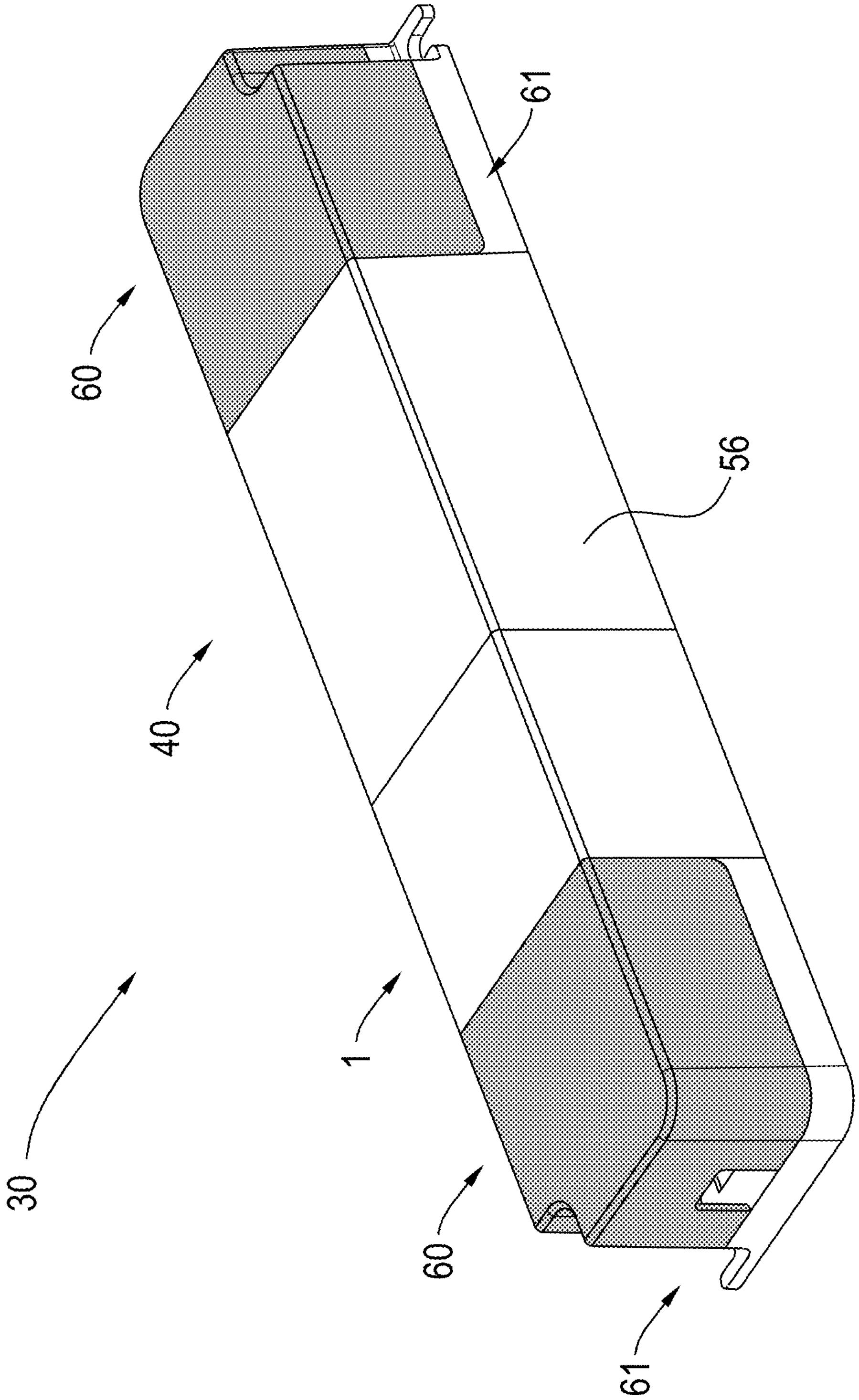
FIG. 10 Shows a perspective view of an electronic device in the form of a ballast with expanded functionality including strain relief according to a further embodiment.

FIG. 10 shows a perspective view of an electronic device in the form of a ballast with extended functionality including strain relief according to a further embodiment.

The electronic device 30 of FIG. 10 may also include the extension module 1, the base module 40, the fastening elements 61 and the cover caps 60. The ballast with extended functionality of FIG. 10, in contrast to the linear ballasts shown in FIGS. 2-9, is designed in the form of a so-called compact ballast, which is expressed in the spatial design or proportions of the ballast, wherein the dimensions in the transverse direction are of the same order of magnitude as the dimensions in the longitudinal direction.

Figure 11:
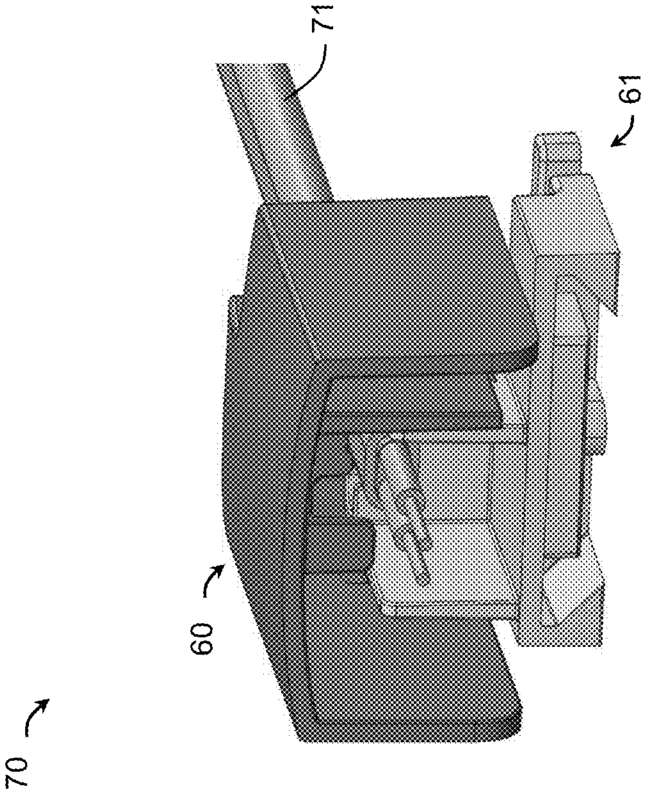
FIG. 11 Shows a perspective view of a strain relief according to FIG. 10.

FIG. 11 shows a perspective view of a strain relief according to FIG. 10. The strain relief 70 comprises a fastening element 61 and a cover cap 60 mounted on the fastening element. FIG. 11 also shows an electrical cable which is passed through the strain relief 70, wherein the electrical cable 71 is squeezed between the fastening element 61 and the cover cap. The squeezing of the electrical cable 71 between the fastening element 61 and the cover cap 60 has the effect that any mechanical tensile forces acting on the cable 71 are absorbed by the strain relief 70, so that the stress to the electrical connections to which the cable 71 is routed underneath the cover cap 60 can be relieved.

Figure 12:
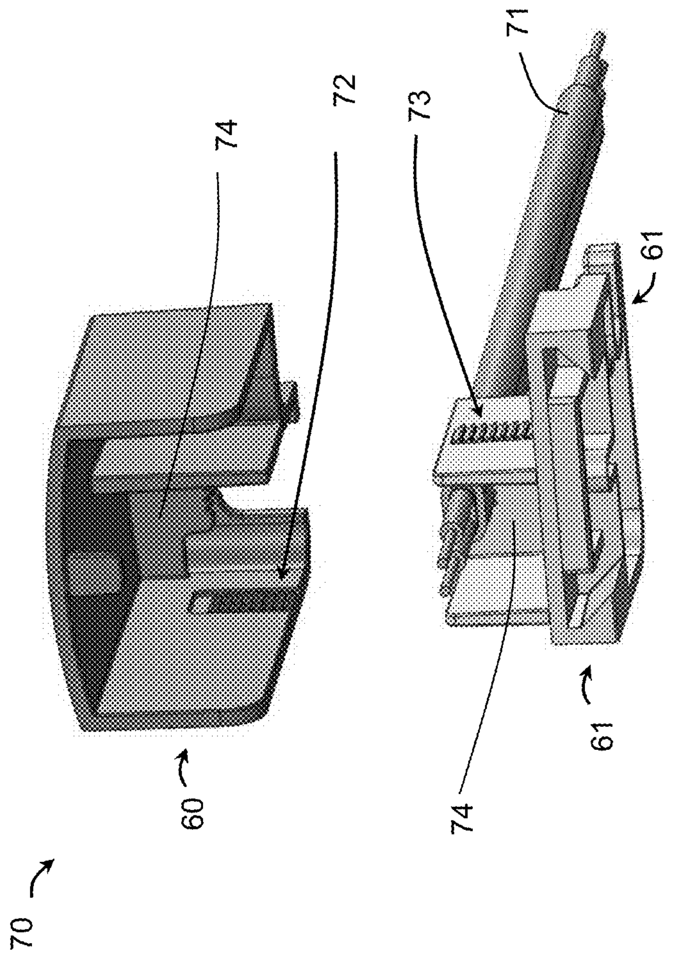
FIG. 12 Shows a perspective view of a strain relief according to FIG. 10 in the open state.

FIG. 12 shows a perspective view of a strain relief according to FIG. 10 in the open state. The cover cap 60 has catches 72 arranged on the inside and the fastening element 61 has catches 73 arranged on the outside, wherein the catches 72 of the cover cap 60 and of the fastening element 61 are designed in such a way that, when the cover cap 60 is placed on the fastening element 61, the catches 72 and 73 engage with one another, as a result of which the cover cap 60 and the fastening element 61 are held together. The cover cap 60 and the fastening element 61 each have a cable routing channel with a toothed cross plate 74. When the cover plate 60 and the fastening element 61 are brought together, the electrical cable 71 is squeezed and fixed between the toothed cross plates 74, whereby the strain relief of the cable at the electrical connections of the ballast is achieved below the cover cap 60.

Figure 13:
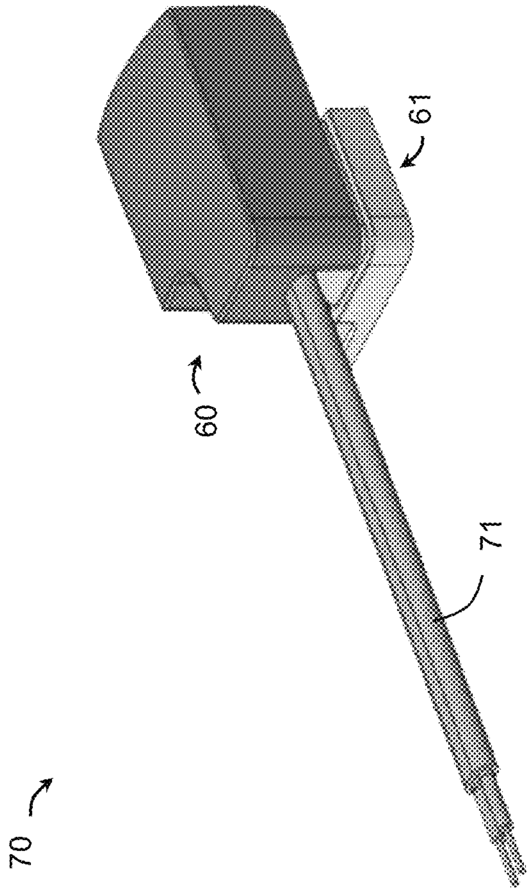
FIG. 13 Shows a further perspective view of the strain relief according to FIG. 11.

FIG. 13 shows another perspective view of the strain relief according to FIG. 11. To clarify the construction, the strain relief 70 is shown in the closed state with the inserted electrical cable 71 from a different perspective.

Figure 14:
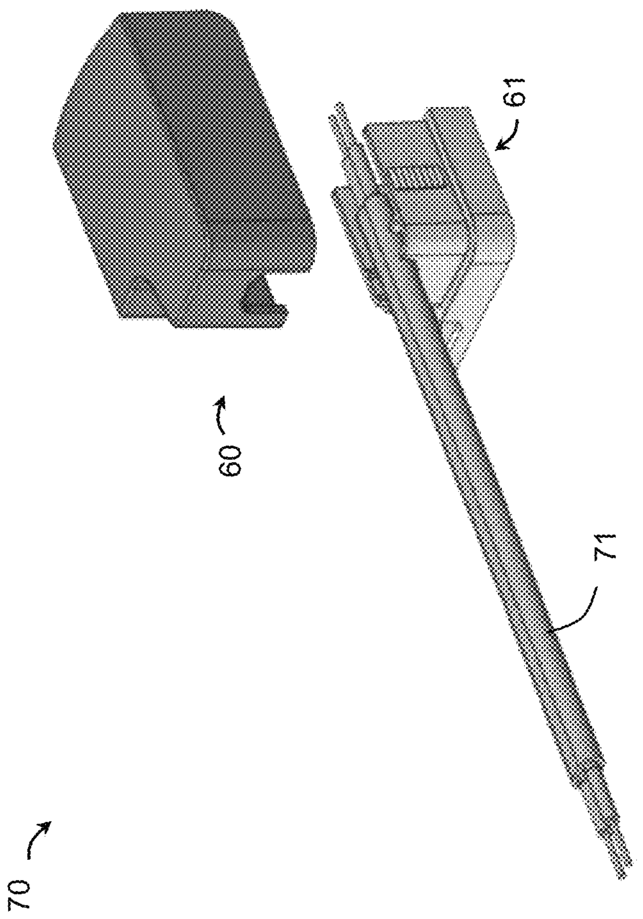
FIG. 14 Shows another perspective view of the strain relief according to FIG. 11.

FIG. 14 shows another perspective view of the strain relief according to FIG. 11. To clarify the construction, the strain relief 70 is shown in the open state together with the electrical cable 71 from a different perspective.

Although at least one exemplary embodiment has been shown in the foregoing description, various changes and modifications may be made. The aforementioned embodiments are examples only and are not intended to limit the scope, applicability or configuration of the present disclosure in any way. Rather, the foregoing description provides the person skilled in the art with a plan for implementing at least one exemplary embodiment, wherein numerous changes in the function and arrangement of elements described in an exemplary embodiment may be made without departing from the scope of protection of the appended claims and their legal equivalents. Furthermore, according to the principles described herein, several modules or several products can be connected with each other in order to obtain further functions.

The invention claimed is:

1. A base module of an electronic device, wherein the base module is configured to provide a basic functionality, and wherein the base module comprises a connection device configured for electrically contacting the base module, wherein the connection device is configured to establish an electrical connection between the base module and an extension module configured for expanding the functionality of the base module beyond the basic functionality to include at least one of wireless communication interfacing and sensor system interfacing, wherein the connection device comprises a voltage connection configured for transmitting electrical power and a signal connection configured for transmitting control signals for controlling the base module, and wherein the base module is configured to be electrically contacted by means of the extension module receiving at the voltage connection an electrical cable which is connected to the extension module from a power source external to the electronic device such that the base module is supplied with electrical power from the power source through the extension module.

2. The base module according to claim 1, wherein the voltage connection comprises a connection terminal configured for receiving one or more contact pins.

3. The base module according to claim 1, wherein the connection device comprises a fastening element configured for mechanically fastening the extension module to the base module.

4. The base module according to claim 1, wherein:
the base module is configured as at least one of:
a ballast; and
a light engine; and
the power source is a voltage grid or mains voltage.

5. An extension module configured for retrofitting an electronic device which comprises a base module configured for providing a basic functionality, the base module comprising a connection device configured for making electrical contact with the base module, wherein the extension module comprises:

a first connection device configured for connecting the extension module to the connection device of the base module, wherein the first connection device comprises:
a first voltage connection configured for transmitting electrical power; and
a first signal connection configured for transmitting control signals for controlling the base module; and a second connection device configured for making electrical contact with the extension module, wherein the second connection device comprises:

a second voltage connection configured for transmitting electrical power; and a second signal connection configured for transmitting control signals for controlling the base module;

wherein the first connection device and the second connection device are connected to one another in such a way that, after the extension module has been connected to the base module, the base module is able to be electrically contacted via the second connection device of the extension module receiving at the second voltage connection an electrical cable which is connected to the extension module from a power source external to the electronic device such that the base module is supplied with electrical power from the power source through the extension module; and wherein the extension module is configured for expanding the functionality of the base module beyond the basic functionality to include at least one of wireless communication interfacing and sensor system interfacing.

6. The extension module according to claim 5, wherein the first connection device and the second connection device are configured complementary to each other.

7. The extension module according to claim 5, wherein the extension module further comprises a functional unit configured for expanding the functionality of the base module, wherein the functional unit comprises at least one of:

a wireless communication interface;

a sensor system comprising at least one of a motion sensor and a light sensor; and a microcontroller.

8. The extension module according to claim 5, wherein:

the extension module is configured as at least one of:

a ballast; and a light engine; and the power source is a voltage grid or mains voltage.

9. An electronic device comprising:

a base module configured for providing a basic functionality, wherein the base module comprises a connection device configured for electrically contacting the base module; and an extension module configured for expanding the functionality of the base module beyond the basic functionality to include at least one of wireless communication interfacing and sensor system interfacing, wherein the extension module comprises:

a first connection device configured for connecting the extension module to the connection device of the base module, wherein the first connection device comprises:

a first voltage connection configured for transmitting electrical power; and a first signal connection configured for transmitting control signals for controlling the base module; and a second connection device configured for electrically contacting the extension module, wherein the second connection device comprises:

a second voltage connection configured for transmitting electrical power; and a second signal connection configured for transmitting control signals for controlling the base module;

wherein the first connection device and the second connection device are connected to one another in such a way that, after the extension module has been connected to the base module, the base module is able to be electrically contacted via the second connection device of the extension module receiving at the second voltage connection an electrical cable which is connected to the extension module from a power source external to the electronic device such that the base module is supplied with electrical power from the power source through the extension module.

10. The electronic device of claim 9, wherein the base module and the extension module each comprise a housing, wherein the housing of the base module and the housing of the extension module conform with one another.

11. The electronic device according to claim 10, wherein the housing is elongated and has a profile, and wherein the housing of the extension module is formed such that connection of the base module with the extension module results in an assembled housing with the same profile.

12. The electronic device according to claim 9, wherein the electronic device further comprises at least one adapter configured for attachment to the connection device of the base module or to the second connection device of the extension module.

13. The electronic device according to claim 12, wherein the electronic device further comprises at least one cover cap configured for attachment to the at least one adapter.

14. The electronic device according to claim 9, wherein:

the base module is configured as at least one of:

a ballast; and a light engine; and the power source is a voltage grid or mains voltage.

15. The electronic device according to claim 9, wherein the extension module is configured for receiving a wireless control signal for controlling operation of the electronic device.

16. The electronic device according to claim 9, further comprising a strain relief device configured to clamp down on the electrical cable for reducing exertion of a tensile force by the electrical cable, which is interfaced with the electronic device, on a connection point on at least one of the base module and the second connection device.

17. The electronic device according to claim 9, wherein the electrical cable is not a component of the base module, the extension module, or the electronic device.

18. The electronic device according to claim 9, wherein the power source is a voltage grid or mains voltage.

* * * * *